US012733768B2

(12) United States Patent
Tonelli et al.

(10) Patent No.: US 12,733,768 B2
(45) Date of Patent: Sep. 15, 2026

(54) SYSTEM FOR MAKING BEVERAGES

(71) Applicant: CAFFITALY SYSTEM S.P.A., Gaggio Montano (IT)

(72) Inventors: Stefano Tonelli, Gaggio Montano (IT); Cristiano Castelli, Alto Reno Terme (IT); Ercole Esposito, Sasso Marconi (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 965 days.

(21) Appl. No.: 17/999,741

(22) PCT Filed: May 19, 2021

(86) PCT No.: PCT/IB2021/054320

§ 371 (c)(1),
(2) Date: Nov. 23, 2022

(87) PCT Pub. No.: WO2021/240308

PCT Pub. Date: Dec. 2, 2021

(65) Prior Publication Data

US 2023/0165401 A1 Jun. 1, 2023

(30) Foreign Application Priority Data

May 25, 2020 (IT) ........................ 102020000012277

(51) Int. Cl.
*A47J 31/44* (2006.01)
*A47J 31/06* (2006.01)
(Continued)

(52) U.S. Cl.
CPC ....... *A47J 31/4492* (2013.01); *A47J 31/0668* (2013.01); *A47J 31/3695* (2013.01); *B65D 85/8058* (2020.05)

(58) Field of Classification Search
CPC .. A47J 31/0668; A47J 31/407; A47J 31/3695; A47J 31/4492; B65D 85/8058
See application file for complete search history.

(56) References Cited

U.S. PATENT DOCUMENTS 7,513,412 B2 4/2009 Benedetti et al.
7,703,381 B2 4/2010 Liverani et al.
(Continued)

FOREIGN PATENT DOCUMENTS

EP 1579793 A1 9/2005
EP 1593329 A1 11/2005
(Continued)

*Primary Examiner* — Brian W Jennison
(74) *Attorney, Agent, or Firm* — Chrisman Gallo Tochtrop LLC

(57) ABSTRACT

A system for making beverages comprising a brewing unit (2) and a capsule (4) containing a powdered food substance (5), the capsule (4) comprising an outer casing (6) and a recognition element (11) placed inside the outer casing (6), wherein the brewing unit (2) comprises a first piercing unit (17), a lighting device (26) associated with the first piercing unit (17) for lighting the recognition element (11), a detecting device (13) configured to detect a return light radiation from the recognition element (11), wherein the detecting device (13) has an acquiring surface (27) fixed to the first piercing unit (17), and the first piercing unit (17) has a distal portion (35) which more than the acquiring surface (27), and wherein alternatively the distal portion (35) is resting on the recognition element (11) and the acquiring surface (27) is at a distance from the recognition element (11), or the distal portion (35) is partly inserted in the recognition element (11) and the acquiring surface (27) is at a distance from the recognition element (11) or resting on the recognition element (11).

18 Claims, 10 Drawing Sheets

(51) Int. Cl.
*A47J 31/36* (2006.01)
*B65D 85/804* (2006.01)

(56) References Cited

U.S. PATENT DOCUMENTS

| | | | | |
|---|---|---|---|---|
| 9,392,902 | B2 | 7/2016 | Perentes et al. | |
| 10,952,563 | B2 | 3/2021 | Rolla | |
| 11,026,539 | B2 | 6/2021 | Zosimadis et al. | |
| 11,344,151 | B2 | 5/2022 | Rolla | |
| 2005/0249052 | A1 | 11/2005 | Benedetti et al. | |
| 2007/0175335 | A1 | 8/2007 | Liverani et al. | |
| 2013/0099597 | A1* | 4/2013 | Perentes | B65D 85/8043 307/116 |
| 2015/0158665 | A1* | 6/2015 | Kruger | B65D 85/8058 426/112 |
| 2016/0174590 | A1* | 6/2016 | Boggavarapu | A47J 31/4492 426/433 |
| 2016/0198889 | A1* | 7/2016 | Flick | A47J 31/407 83/30 |
| 2016/0242594 | A1* | 8/2016 | Empl | A47J 31/4492 |
| 2017/0181570 | A1* | 6/2017 | Zosimadis | A47J 31/4492 |
| 2019/0142212 | A1* | 5/2019 | Rolla | B65B 29/022 426/115 |
| 2020/0060467 | A1 | 2/2020 | Zosimadis et al. | |
| 2020/0275797 | A1* | 9/2020 | Rolla | B65B 29/022 |

FOREIGN PATENT DOCUMENTS

| | | | |
|---|---|---|---|
| WO | 2012000878 | A2 | 1/2012 |
| WO | 2012000878 | A3 | 3/2012 |
| WO | 2016176779 | A1 | 11/2016 |
| WO | 2017195170 | A1 | 11/2017 |
| WO | 2021090186 | A1 | 5/2021 |

* cited by examiner 30
22
28
17
36
35
29
38
37
39

23
36
27
35
17
28
36
37

SYSTEM FOR MAKING BEVERAGES

This invention relates to a system for making beverages, of the type which comprises a brewing unit and a capsule containing a powdered food substance, in which the brewing unit is configured to house the capsule inside it and to make the beverage by feeding water inside the capsule, so as to make it interact with the powdered food substance.

The interaction between the water and the powdered food substance, may consist of only extraction of the organoleptic substances from the food substance (as in the case of making an espresso coffee), or complete dissolving of the food substance (as in the case of making a chocolate flavoured or milk based beverage).

At present there are many prior art systems of the type described above, each characterised by the type of brewing unit and by the related operation, and, above all by the type of capsule used. Within each system there may also be various versions of capsule, which all correspond to a more general model, but each of which is intended for making a specific beverage. For example, in the same system, the capsules may have significant differences depending on whether they are intended for making a beverage by extracting only the organoleptic substances from the powdered food substance, or by dissolving the entire powdered food substance. The differences may relate both to the structure of the capsule, and to the powdered food substance and its particle size.

At least most of the systems currently on the market, have also been developed by optimising over time the interaction between the brewing unit and each version of the capsule usable with the brewing unit. That optimisation, on one hand related to the structure of the capsule (which, even for the same general model, may vary significantly in the details depending on the beverage to be made), and on the other hand to the brewing parameters used by the unit. The main brewing parameters which may be set are the water temperature, the water pressure, the water flow rate, the total quantity of water and if necessary the pre-infusion time (time during which, before proceeding with brewing of the beverage, and after the capsule has been filled with water, the water feeding is interrupted, usually in order to allow improved extraction of the organoleptic substances).

At least for the most widespread systems, on the market, in addition to original capsules, there are also so-called compatible capsules, that is to say capsules made by manufacturers different from those which developed and sold the original system, but which are sold for use in the original brewing units. Compatible capsules, although having an outer shape which allows them to be inserted in the original brewing units, do not usually reflect the materials and structure of the original capsules, nor do they contain a food substance with the same characteristics as that of the original capsules.

Therefore, the selling of compatible capsules has caused some problems to emerge.

The first problem is linked to the fact that, in order to be attractive to consumers, the compatible capsules usually have to be sold at a lower price than original capsules and therefore have to be made by limiting production costs, which in many cases is detrimental to the quality of the beverage made. Second, since, as already indicated, the brewing unit brewing parameters are usually optimised for specific capsule models, the use of compatible capsules may lead to the obtainment of beverages whose quality is not optimal (and in some cases may even be poor), to jamming of compatible capsules inside the brewing unit or even to damage to the machine (for example if the capsule causes an excessive pressure drop and forces the brewing unit pump to operate in conditions more demanding that those for which it is designed).

Both to allow brewing with each original capsule version with the most correct brewing parameters, and to be able to recognise the presence in the brewing unit or non-original capsules which are potentially hazardous for the machine, over the years various systems have also been developed in which the brewing unit can tell the difference between original capsules and non-original capsules. In some cases, the brewing unit can also recognise the version of original capsule inserted.

In these cases the brewing units are also programmed to manage brewing of the beverage depending on the type or model of capsule recognised (or not). Some brewing units, for example, are programmed to allow brewing of the beverage only if the capsule inserted is recognised as an original capsule. In contrast, other brewing units allow the beverage to be made even with non-original (or, more generally, unrecognised) capsules, but in that case they may use specific precautionary brewing parameters, specially designed to protect the unit itself from possible damage.

Moreover, as already indicated, more complex brewing units can recognise a plurality of different versions of original capsules and, for each of them, can use a specific combination of brewing parameters. However, in some applications, once they have recognised the original capsule, the brewing units set the predefined brewing parameters but also allow the user to change at least some of them (for example they may allow changes to the total quantity of water or they may allow brewing with a capsule, in theory intended for making espresso coffee, as if it were a capsule for making a filter coffee or Americano).

Over time, many diverse solutions have been developed to allow recognition of original capsules.

According to a first technology the capsule is equipped with an electromagnetic type identification element (such as an RFID element) and the machine comprises a corresponding reader. Although this solution allows good results in functional terms, it is not economically advantageous due to the need to use a relatively expensive identification element on each capsule. In contrast, a second technology currently used has optical recognition of the capsule by means of a reading device placed at the infusion chamber or upstream of it, and suitable for reading a bar code, or a QR-code, or another graphic symbol located on the outer part of the capsule. However, this solution also has some disadvantages. In particular, the reliability of the recognition may be reduced over time, due to the fact that the infusion chamber is a dirty place in which in normal conditions the beverage at least partly circulates which may therefore leave residues on the walls and in particular on the optical recognition device, and in which there may also be accidental leaks of the food substance present in the capsules which may in turn become caked on the walls. Moreover, especially in the case of brewing operations which take place one after another, the presence of water vapour released at the end of each brewing operation may result in misting of the recognition system. Furthermore, in commercial terms, the need to reproduce a bar code or a QR-code on the capsule has a negative impact on the appeal that the capsule appearance may have for the buyer.

In contrast, in a third known type of recognition use is made of a recognition element which is always recognisable with a simple visual inspection (as in the case of the second type), but positioned inside the capsule (as in the case of the first type).

An example of this type is described in patent application WO 2017/195170, in which a recognition element is positioned inside the capsule, below the top film, and the reading of the recognition element takes place by means of a reading device which pierces the top film and which lights the recognition element for a predetermined time with a light having known frequency. According to the solution described in that patent recognition only occurs if, following receipt of the lighting, the recognition element emits light with a specific frequency, different from that of the lighting, for a time different from that of the lighting. The reading device may also be independent relative to the piercer through which the water is fed inside the capsule, or may be integrated in that piercer by means of the use of optical fibres.

Considering the general idea described in patent application WO 2017/195170 interesting, the Applicant carried out precise design and testing work which highlighted the need for technical improvement to the solutions described in that patent application, in particular concerning the reliability of recognition of original capsules.

Whilst a certain number of false positives (that is to say, non-original capsules recognised as originals) may easily be tolerated, in contrast it is essential that the number of any false negatives (that is to say, unrecognised original capsules) be as low as possible, and preferably equal to zero. In contrast the tests highlighted that the technical solutions described in WO 2017/195170 did not always allow that result.

The tests carried out, in particular, highlighted that with the recognition method described in WO 2017/195170, the reliability of the recognition is heavily dependent on the manufacturing precision of the capsule and of the reading device. In particular, they highlighted that in order to be able to guarantee highly reliable recognition it would be necessary to make the capsules with manufacturing tolerances significantly lower than those currently used with a considerable increase in costs. A solution which could be implemented with the manufacturing tolerances normally used would therefore be desirable.

Furthermore, it was possible to establish that by applying a recognition element on a flat sheet for water distribution mounted inside the capsule, a capsule may not be recognised due to the presence of those granules of the powdered food substance which usually succeed in passing through the distribution sheet, and which take up a position above the recognition element. Indeed, the presence of those granules distorts the optical response of the recognition element to the exciting signal given by the machine. A solution less exposed to the risk of false negatives caused by granules of powder would therefore be desirable.

Not least, even the decision to base the recognition on the combination of frequency and duration of the light radiation emitted by the recognition element proved relatively complicated, in particular for distinguishing between different versions of original capsules. Therefore, an alternative solution would be desirable.

In this context the technical purpose which forms the basis of this invention is to provide a system for making beverages which overcomes or limits at least some of the above-mentioned disadvantages.

In particular, the technical purpose of this invention is to provide a system for making beverages, of the type which uses an optical recognition element placed inside the capsule, which is capable of guaranteeing a high level of recognition reliability, despite using the normal manufacturing tolerances when making the brewing unit and capsules.

The technical purpose specified and the aims indicated are substantially achieved by a system for making beverages as described in the independent claims. Particular embodiments of this invention are defined in the corresponding dependent claims.

While providing the system according to this invention, other innovative aspects were also devised, some of them relating mainly to the brewing unit 2, others relating mainly to the capsule. The detailed description which follows will describe all of the innovative aspects which have been provided, since they may all be considered part of a same more general invention and may all also be incorporated in a same system for making beverages; however, only the innovative aspect which is the subject matter of this invention is covered in the appended claims. Indeed, the Applicant reserves the right to protect each innovative aspect independently in separate patent applications, and if necessary by subsequently filing divisional applications. The Applicant also reserves the right to protect, if necessary even independently, any combination of two or more of such innovative aspects.

Further features and the advantages of this invention are more apparent in the detailed description, with reference to the accompanying drawings which illustrate several preferred, non-limiting embodiments of a system for making beverages, in which.

Figure 17:
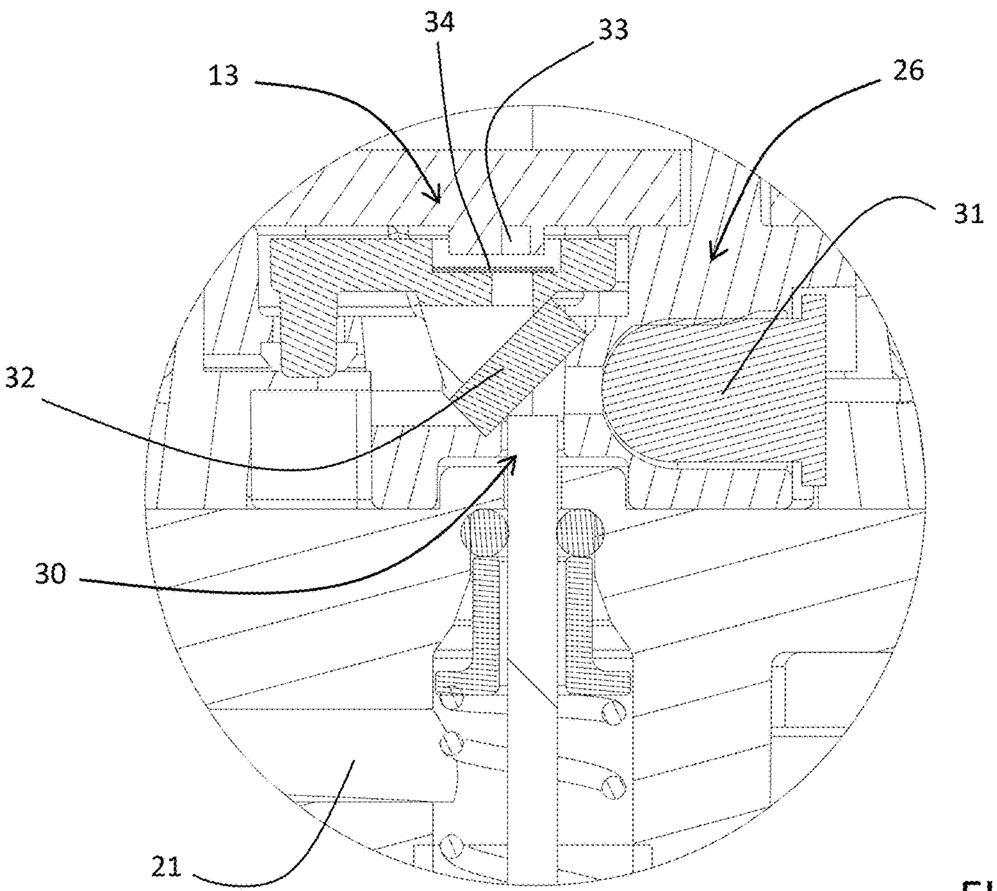
Figure 16:
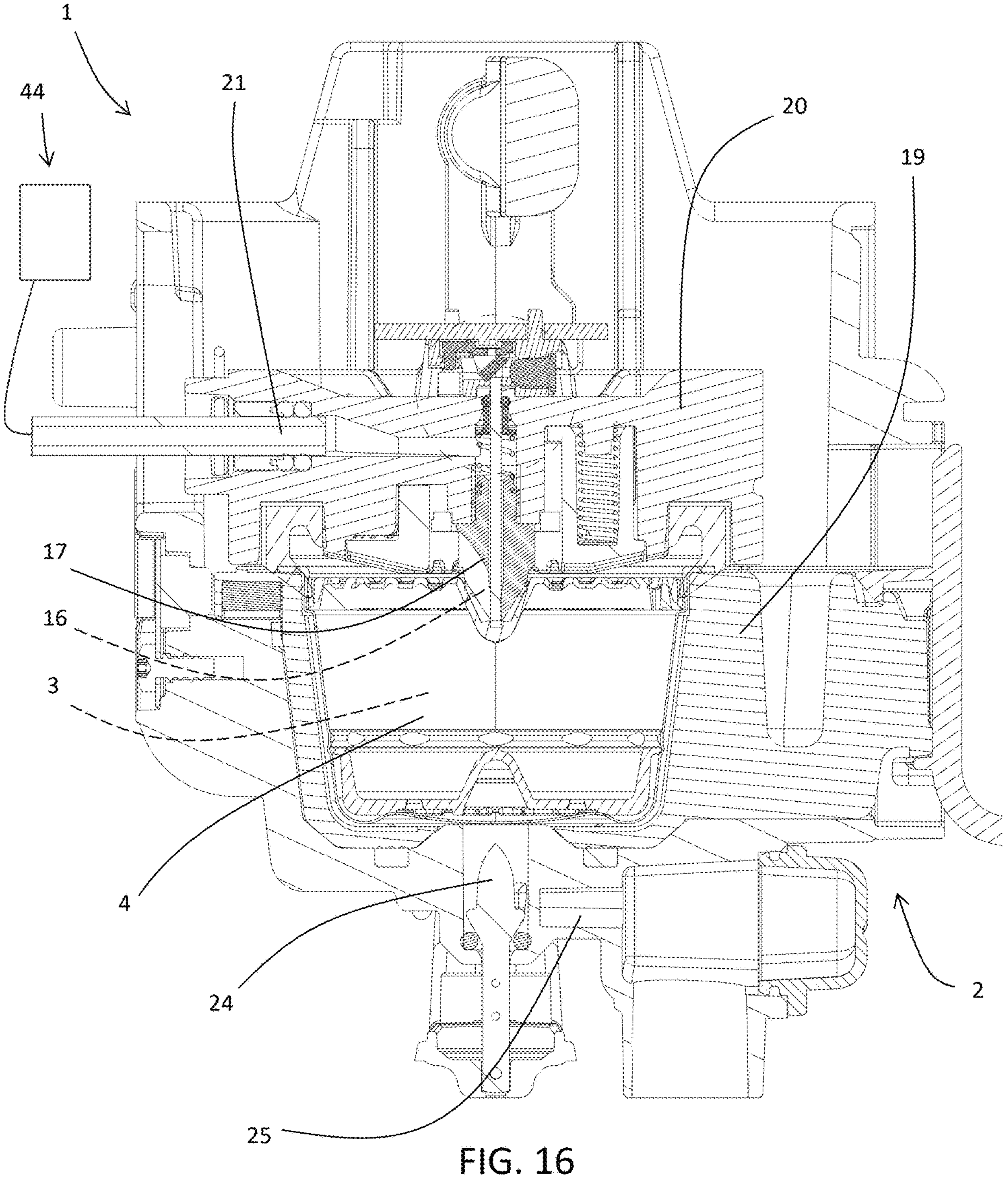
Figures 18, 19:
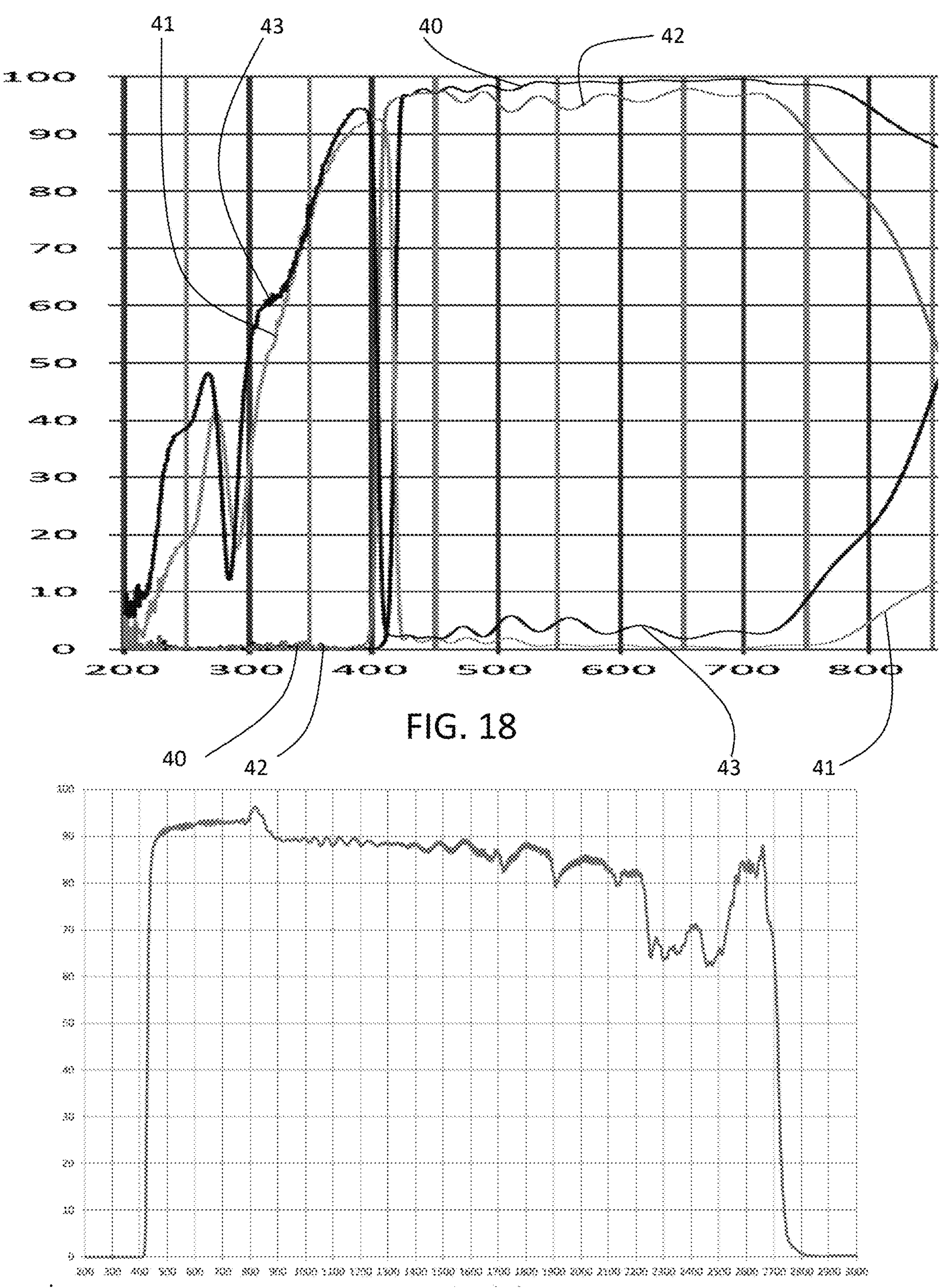
Figure 20:
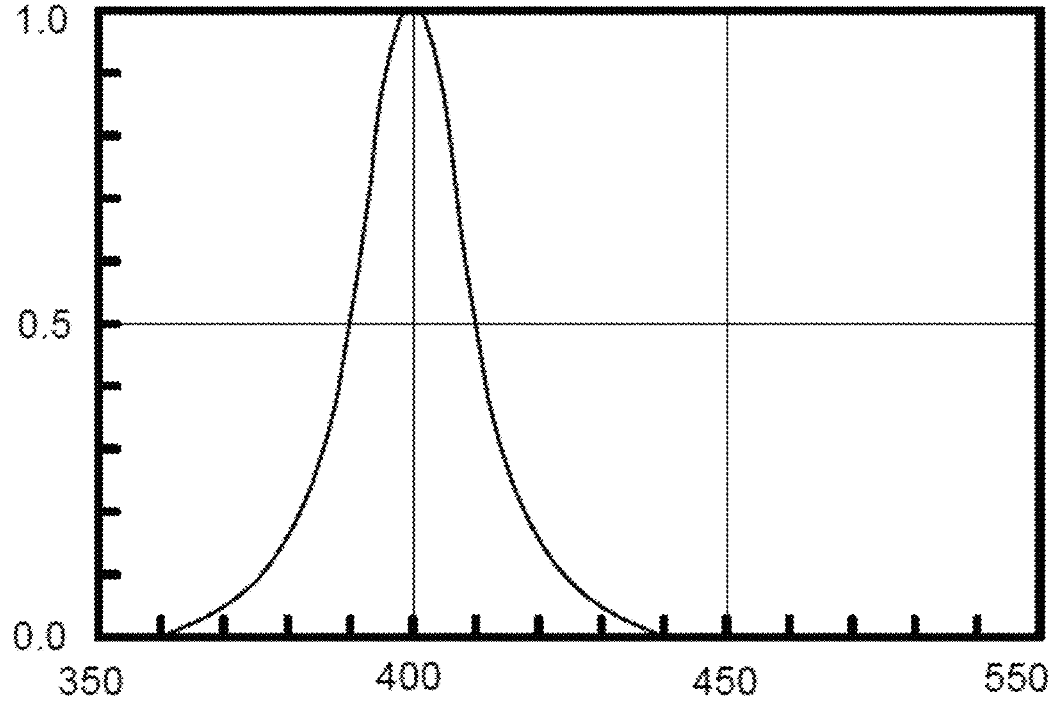

FIG. 16 is an axial section of a system for making beverages in accordance with this invention, which comprises a brewing unit in accordance with the second innovative aspect of this invention and a capsule in accordance with the first innovative aspect of this invention; respectively the capsule and the brewing unit may also be made in accordance with a third and a fourth innovative aspect of this invention, the related characteristics not being representable in the drawing;

FIG. 17 is an enlarged view of the detail XVII of FIG. 16;

FIG. 18 is a graph showing the frequency behaviour of the 420FDL50 dichroic filter from English company Knight Optical Ltd.;

FIG. 19 is a graph showing the frequency behaviour of the 430FWP7575 filter from Knight Opticals Ltd; and FIG. 20 is a graph showing the relative emission intensity of the LDUV2043 LED from the company Ligitek Electronics Co., Ltd., powered with a 20 mA current.

This invention and the more general invention of which it is a part, relate to a system 1 for making beverages which comprises, on one hand, a brewing unit 2 which defines an infusing chamber 3 and, on the other hand, a capsule 4, containing the powdered food substance 5, configured to be able to be inserted in the infusion chamber 3.

In general, the capsule 4 comprises an outer casing 6 which contains the powdered food substance 5 inside it.

In the preferred embodiment, the outer casing 6 comprises a cup-shaped body 7 closed by a lid 8. Advantageously, the cup-shaped body 7 is made by moulding, injection or thermoforming, whilst the lid 8 is constituted of a film. The cup-shaped body 7 may be single-layer or multi-layer and each layer made be made of various materials, such as aluminium, plastic, cellulose or PLA. The lid 8 may also be made of the same materials.

In some embodiments the whole outer casing 6 may be made at least mainly of the same material (for example, a polypropylene-based mixture).

In some embodiments the whole capsule 4 may be made of recyclable material (for example of one or more polypropylene-based mixtures) or of compostable material (for example of one or more PLA-based mixtures).

An infeed wall 9 and an outfeed wall 10 are identifiable in the outer casing 6. The infeed wall 9 is the wall through which, in use, water is fed into the inside of the capsule 4, whilst the outfeed wall 10 is the wall through which the beverage come outs; both are therefore definable considering the condition in which the capsule 4 is used in the brewing unit 2. In some embodiments such as those illustrated in the accompanying figures, the infeed wall 9 is constituted of the lid 8 of the containment body, whilst the outfeed wall 10 is constituted of a bottom wall of the cup-shaped body 7.

In some embodiments the outer casing 6 is sealed and is oxygen-tight, in contrast in other embodiments it may be permeable to oxygen, for example due to the presence of one or more holes; in this latter case the outer casing 6 will preferably be sold in a sealed, oxygen-tight package.

The capsule 4 also comprises a recognition element 11 placed inside the outer casing 6, contained in it and separate relative to the outer casing 6. The recognition element 11 is advantageously interposed between the outer casing and the powdered food substance 5, preferably between the infeed wall 9 and the powdered food substance 5.

The recognition element 11 comprises a reading surface 12 which is configured to face a detecting device 13 which is part of the brewing unit 2. In some embodiments, the capsule 4 also comprises a distributing unit 14, also interposed between the infeed wall 9 and the powdered food substance 5. The distributing unit 14 has the function of distributing the entering water in the powdered food substance 5, in the way considered best for making a specific beverage.

For example, to make a beverage which only involves extraction of organoleptic substances from the powdered food substance 5, the distributing unit 14 is preferably configured as a sort of uniformly pierced filter, occupies the entire cross-section of the outer casing 6 and leaves a free space between itself and the infeed wall 9 to allow a uniform distribution of the water over the entire pierced surface. An example of a distributing unit 14 of this type is illustrated in FIGS. 3 and 4.

Figure 7:
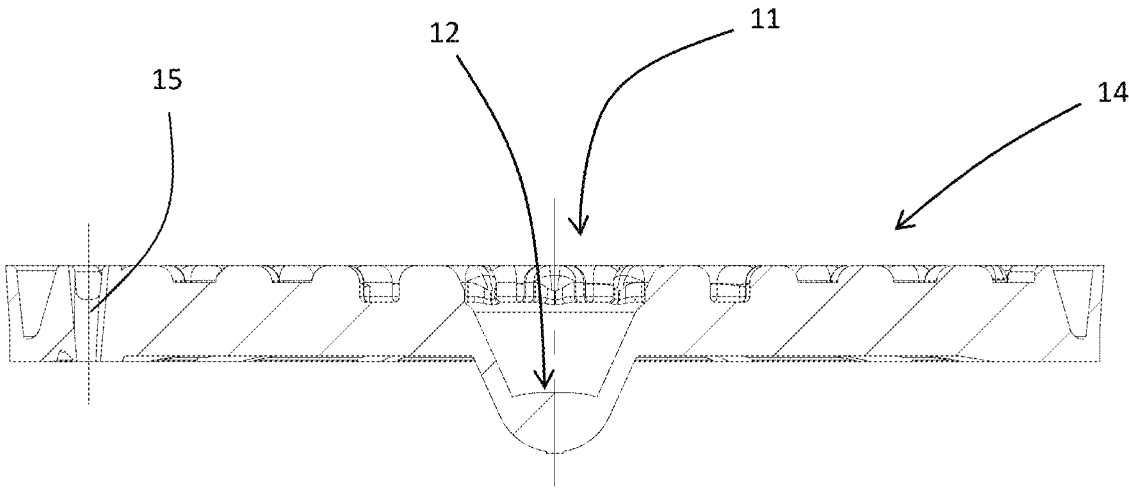
FIG. 7 is a front view of a distributing unit of the capsule in section of FIG. 6.

In contrast, to make a beverage involving dissolving of the powdered food substance 5, the distributing unit 14 is preferably configured with one or few through holes 15 positioned near a lateral wall of the outer casing 6 (a single hole in the case of the distributing unit 14 of FIG. 7). Again in this case the distributing unit 14 may be configured to leave a free space between itself and the infeed wall, in this case for the sole purpose of allowing the water to reach the one or more through holes 15.

Figures 1, 2:
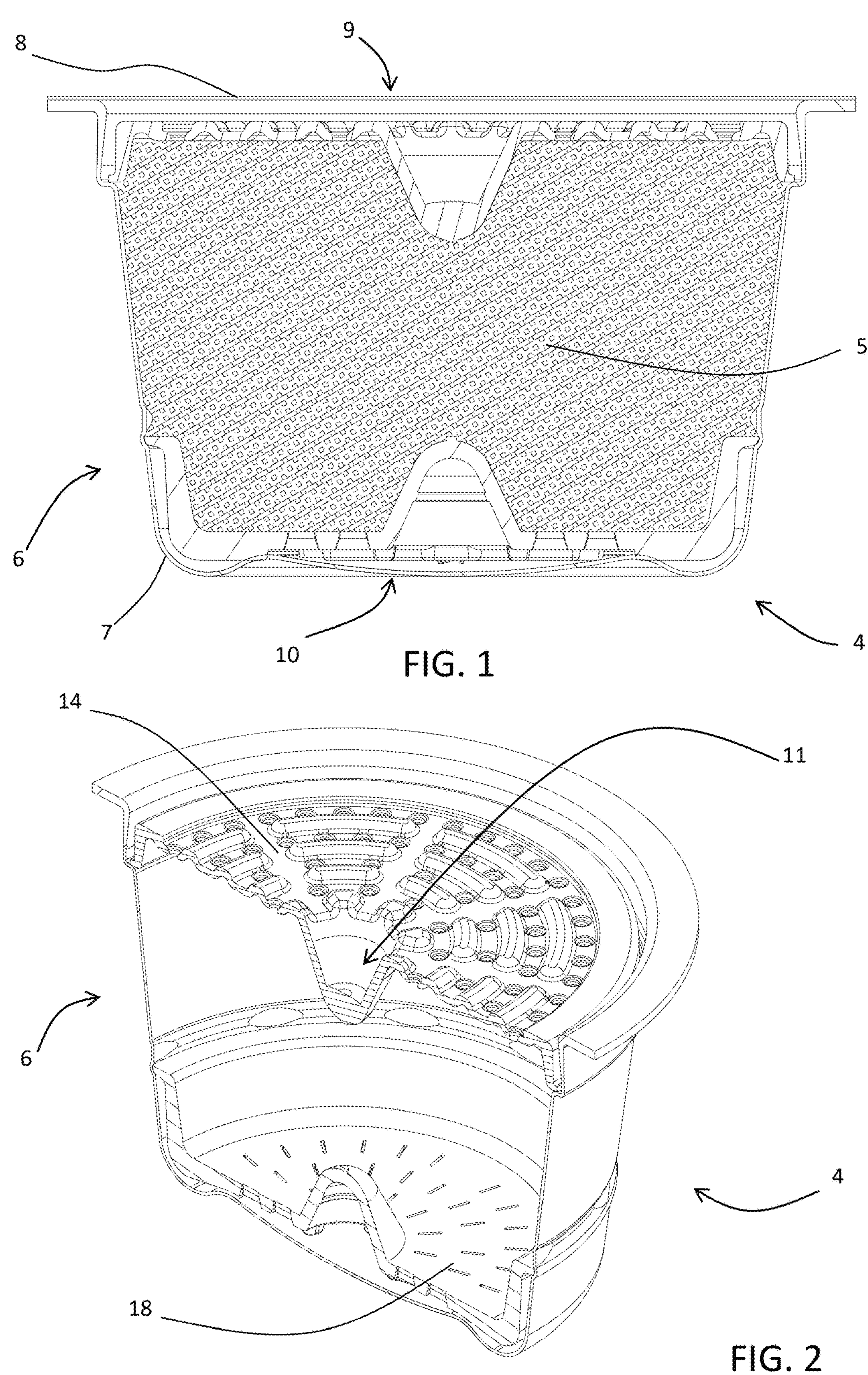
FIG. 1 is an axial section of a first capsule made in accordance with a first innovative aspect of this invention.
FIG. 2 shows the capsule in cross-section of FIG. 1, in an axonometric view, and without both a powdered food substance, and a closing top film.
Figure 3:
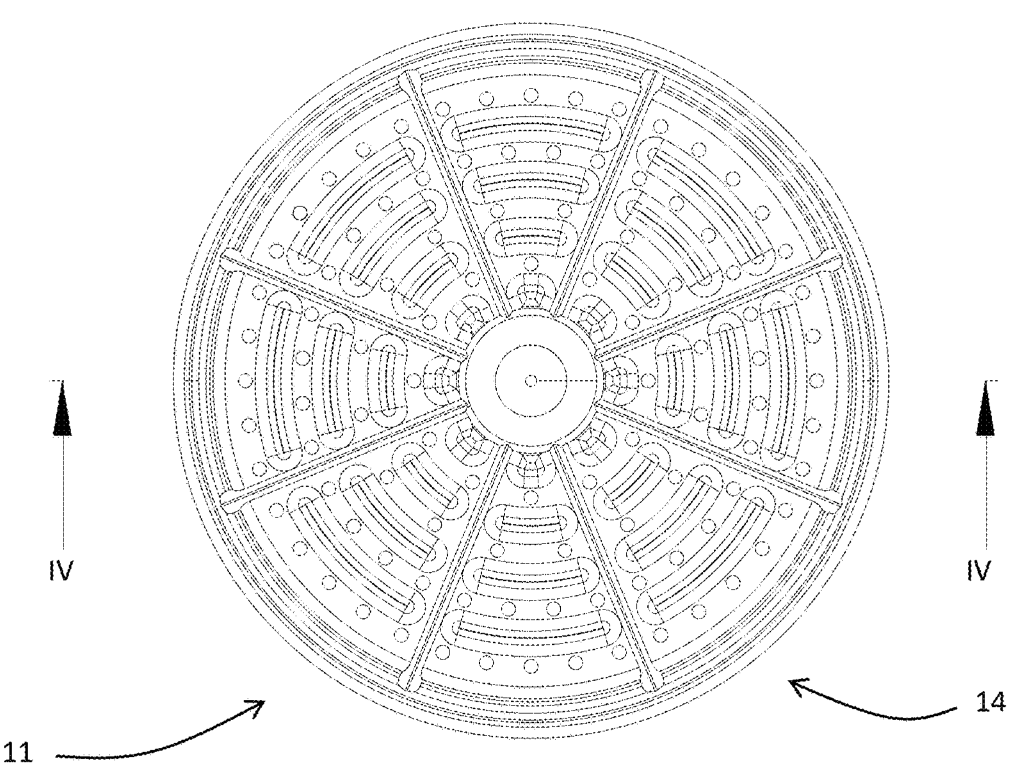
FIG. 3 is a bottom view of a water distributing unit of the capsule of FIG. 1.
Figure 4:
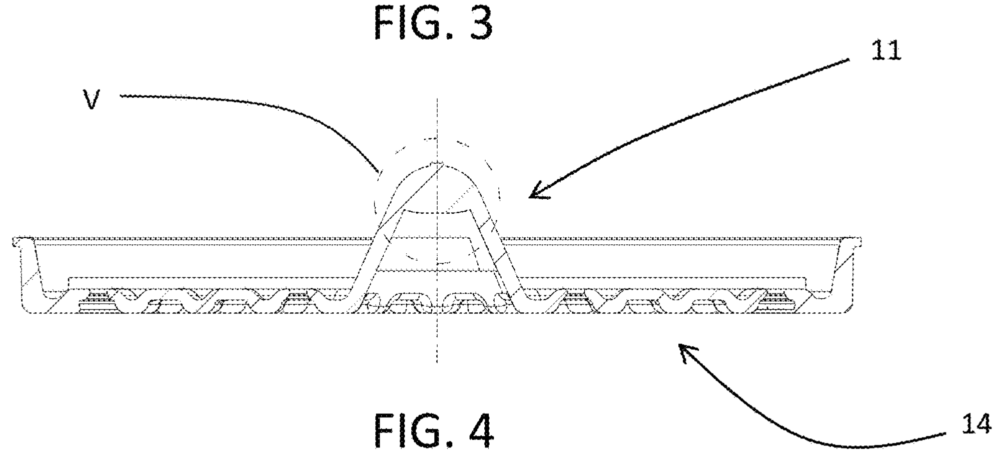
FIG. 4 is a cross-section of the distributing unit of FIG. 3 according to the line IV-IV.

In the case of the embodiments illustrated in FIGS. 3 and 7, the free space between the distributing unit 14 and the lid 8 is obtained thanks to the presence of protuberances on the distributing unit 14 itself.

In some embodiments, the recognition element 11 is associated with the distributing unit 14.

In some embodiments the recognition element 11 is integrated in the distributing unit 14 or constitutes a part of it or is constituted of a part of it.

In some embodiments, such as those illustrated in the accompanying figures, the recognition element 11 is constituted of the distributing unit 14.

In some embodiments, the distributing unit 14 has a recess 16.

In some embodiments the recess 16 is configured to house a first piercing unit 17 of the brewing unit 2, when the capsule 4 is inserted in the infusion chamber 3. Advantageously, the recess 16 is positioned at the centre of the distributing unit 14.

Depending on the embodiments the capsule 4 may also comprise other elements (such as a filter 18 interposed between the powdered food substance 5 and the outfeed wall 10) or may have further features without thereby departing from the scope of this invention.

Similarly to the prior art brewing units, even the one according to this invention comprises a first part 19 and a second part 20, which are switchable between a home configuration and a brewing configuration.

When they are in the home configuration, the first part 19 and the second part 20 are at a distance from each other and allow the loading of a new capsule 4 between them, or the removal of a used capsule 4. When they are in the brewing configuration, the first part 19 and the second part 20 are coupled and between them delimit the infusion chamber 3, in which the capsule 4 is intended to be enclosed (indeed, the capsule 4 is configured to be inserted in the infusion chamber 3).

The arrangement of the first part 19 and of the second part 20 relative to each other, their movement relative to each other, and the ways in which a capsule 4 is fed to the infusion chamber 3, and those for removing a used capsule 4 from the infusion chamber 3, may vary according to requirements. For example, the brewing unit 2 may be a vertical unit, a horizontal unit, an angled unit, and may be configured to allow the feeding and ejecting of the capsule 4 by simple gravity, or in another way.

In some embodiments one, of either the first part 19 or the second part 20, defines a housing in which the capsule 4 can be inserted, whilst the other constitutes a lid for closing the housing. The watertight seal between the first part 19 and the second part 20 can be obtained at a flange of the capsule 4, which can be clamped between them.

In the case of the embodiment illustrated in FIG. 16, the first part 19 is constituted of a horizontally extractable drawer, in which the housing for the capsule 4 is made, whilst the second part 20 is vertically movable, between the home configuration (not illustrated) and the brewing configuration (FIG. 16).

In the known way, the brewing unit 2 comprises a first piercing unit 17 configured to pierce the infeed wall 9 of the capsule 4 when the capsule 4 is inserted in the infusion chamber 3. In the embodiment of FIG. 16 the first piercing unit 17 is fixed to the second part 20 and is fixed relative to it. In other embodiments it may be fixed to the second part 20 and/or be movable relative to the part to which it is fixed.

The first piercing unit 17 is advantageously configured to allow the brewing unit 2 optical access to the recognition element 11.

Depending on the embodiments, the first piercing unit 17 may create one or more openings through the infeed wall 9.

The brewing unit 2 comprises supplying means 44 for supplying hot water, inside the capsule 4 inserted in the infusion chamber 3, and means for causing the outflow, from inside the capsule 4, of a beverage which has formed following interaction of the hot water with the powdered food substance 5.

In the known way, the hot water supplying means 44 may comprise a water tank, a pump, a boiler (which are not illustrated) and a feeding duct 21, which extends from the tank to the infusion chamber 3 through the pump and the boiler. Depending on the embodiments, introduction of the hot water inside the capsule 4 may take place through the opening made by the first piercing unit 17, through an opening made by a different piercing unit, or directly through the infeed wall 9 if the latter is itself pierced or permeable.

In some embodiments, the hot water supplying means 44, in particular the feeding duct 21, comprise an intake duct 22 made in the first piercing unit 17 and which leads into the infusion chamber 3. In use, when a capsule 4 is inserted in the infusion chamber 3 and the first piercing unit 17 has pierced the infeed wall 9, the intake duct 22 leads into the capsule 4, between the infeed wall 9 and the recognition element 11.

In some embodiments the intake duct 22 has an outlet 23 which is radial relative to a central axis of the first piercing unit 17.

The means for causing the outflow of the beverage, which forms in the capsule 4 following interaction between the hot water and the powdered food substance 5, may comprise a second piercing unit 24 for piercing the outfeed wall 10, one or more channels 25 for collecting and guiding the beverage towards a supplying zone (below which a cup can be positioned), and/or other elements of the known type. The second piercing unit 24 may be fixed or movable, may be active (that is to say, actively pierce the outfeed wall 10) or passive (that is to say, constitute a contact element against which the outfeed wall 10 tears following the increase in pressure inside the capsule 4). If the outfeed wall 10 is already pierced or is permeable to water, obviously the second piercing unit 24 is not necessary.

A lighting device 26 is associated with the first piercing unit 17 and is configured to light, in use, the recognition element 11 with an incident light radiation. Also associated with the first piercing unit 17 is a detecting device 13, configured to detect a return light radiation which is emitted and/or reflected by the recognition element 11 following the lighting with the incident light radiation. In some embodiments the detecting device 13 has an acquiring surface 27 for acquiring the return light radiation which, in use, is located placed near the recognition element 11, whilst the rest of the lighting device 26 is in a remote position.

Preferably, both the lighting device 26, and the detecting device 13, are configured to optically interact with the recognition element 11, through at least one opening which the first piercing unit 17 creates in the infeed wall 9. Moreover, advantageously, the incident light radiation has a known band of wavelengths.

In some applications it may be a band in the ultraviolet range, in others a band in the visible range, in others a band straddling the visible and ultraviolet ranges.

In some embodiments, the lighting device 26 comprises a light radiation transmitting element 28, for sending the incident light radiation towards the reading surface 12 of the recognition element 11.

In some embodiments, the detecting device 13 comprises a light radiation transmitting element 28, configured to collect the return light radiation.

Advantageously, there may be a single light radiation transmitting element 28 and it may be part of both the lighting device 26 and the detecting device 13. The transmitting element 28 extends between a first end 29, which is associated with the first piercing unit 17 and which, in use, is directed towards the recognition element 11, and a second end 30, placed outside the infusion chamber 3. The first end 29 constitutes an incident light emitting surface for the lighting device 26, whilst it constitutes the return light radiation acquiring surface 27 for the detecting device 13.

When the capsule 4 comprises a distributing unit 14 which forms a recess 16, the recess 16 may be configured to accommodate the first end 29 of the light radiation transmitting element 28.

In some embodiments the light radiation transmitting element 28 is constituted of an optical fibre.

In some embodiments, such as the one illustrated in FIG. 17, the lighting device 26, in addition to the transmitting element 28, comprises an LED 31, misaligned relative to the transmitting element 28, and a mirror 32 positioned in such a way as to reflect at least part of the light radiation which it receives from the LED 31, in the transmitting element 28; for example the optical axis of the LED 31 may be angled 90° relative to the optical axis of the second end 30 of the transmitting element 28, and the mirror 32 may be flat and angled 45° relative to both of the optical axes (which intersect on the surface of the mirror 32).

In some embodiments (such as those according to the second innovative aspect described below), the mirror 32 is a dichroic filter, like that sold with code 420FDL50 by English company Knight Optical Ltd. The dichroic filter is configured to cause the reflection of only the light radiations with wavelengths mainly included in the ultraviolet band (preferably in the band up to 405 nm), and in contrast to be transparent at least to most light radiations in the visible band (in particular preferably to those with wavelength higher than 405 nm). In the case of the dichroic filter from Knight Optical Ltd. indicated above, that result is achieved using the filter angled at 45° relative to the light radiation arriving from the LED 31. The frequency behaviour of the above-mentioned Knight Optical Ltd. dichroic filter, in the frequencies of interest, is shown in the graph in FIG. 18, where the x-axis shows the wavelength values in nm, and the y-axis the percentage of electromagnetic radiation reflected or transmitted. Curve 40 indicates the radiation transmitted with angle of incidence equal to 0°, curve 41 indicates the radiation reflected with angle of incidence equal to 0°, curve 42 indicates the radiation transmitted with angle of incidence equal to 45°, and curve 43 indicates the radiation reflected with angle of incidence equal to 45°.

In some embodiments, the band of the incident light radiation is between 360 and 405 nm. In some embodiments, for that purpose the LED 31 is configured to emit light radiations with wavelengths in that band. In other embodiments, use of the dichroic mirror indicated above in contrast allows use of LED 31 which, as well as the desired frequencies in the ultraviolet band, also emit unwanted light radiations in the visible range (as in the case described below), since such visible radiations are not reflected towards the transmitting element 28 and therefore do not reach the recognition element 11.

In some embodiments the detecting device 13 comprises an electronic sensor 33 optically associated with the second end 30 of the transmitting element 28 for receiving light radiation emitted by the second end 30.

In some embodiments, in which the detecting device 13 is configured to detect radiations in the visible range, the dichroic mirror advantageously also intercepts the return light radiation, only allowing that in the visible band to pass, reflecting the ultraviolet radiation elsewhere.

The brewing unit 2 also comprises an electronic control unit (not illustrated) which can be connected to the various operating parts of the unit itself, such as the boiler, the pump, any motors for moving the first part 19 and the second part 20, the lighting device 26, the detecting device 13, etc. and which is programmed to control their operation.

In particular, the electronic control unit is connected to the detecting device 13 for receiving from it, in electronic format, real data relating to characteristics of the return light radiation. Advantageously, the real data are quantitative physical measurements correlated with the return light radiation, such as data relating to the intensity, data relating to the frequency, data relating to the duration, etc.

In some embodiments the real data are prepared by the detecting device 13 and sent to the electronic control unit ready for the use which it must make of them (for which the methods are described below). In other cases, the real data are sent to the electronic control unit together with other data, incorporated in other data, or must in any case be derived from other data acquired by the detecting device 13. In these cases, the electronic control unit will be programmed to process the data received and to obtain the real data of interest.

The electronic control unit is also programmed to execute a comparing step, on the basis of the real data received, and a managing step on the basis of the result of the comparing step.

During the managing step, the electronic control unit compares the real data, received from the detecting device 13, with saved reference data, and determines whether or not the real data match the reference data. The rules on the basis of which to establish whether or not a match exists may be set out each time based on the type of data item to be considered. For example, if the reference data are precise values, a match may exist when the real data deviate from the reference data by less than a predetermined margin of error (which will be expressable both in absolute terms and in percentage or relative terms); otherwise, if the reference data are already expressed in terms of range, a match will exist when the real data fall within the range.

During the managing step, the electronic control unit manages operation of the brewing unit 2; however, in accordance with this invention, the electronic control unit is programmed to manage operation of the brewing unit 2 in a different way if the comparing step indicates that the real data match reference data, compared with if the comparing step indicates that the real data do not match the reference data.

In some embodiments, the electronic control unit is programmed to allow a beverage to be made only when the comparing step indicates that the real data match the reference data.

In some embodiments, in which the electronic control unit is connected to the hot water supplying means in order to control their operation, the electronic control unit is programmed to control operation of the hot water supplying means in a different way, if the comparing step indicates that the real data match reference data, compared with if the comparing step indicates that the real data do not match the reference data.

In some embodiments, if the comparing step indicates that the real data do not match the reference data, the electronic control unit can be programmed to make the hot water supplying means operate by adopting safety supplying parameters compared with those adopted if a match exists.

The different programmings described above are intended to distinguish between original and non-original capsules, and to allow, either only brewing with original capsules, or also brewing with non-original capsules but with different brewing parameters (for example safety parameters).

In some embodiments, the saved reference data comprise a plurality of separate alternatives, and the electronic control unit is programmed to control operation of the hot water supplying means in different ways, depending which of the various possible reference data alternatives the real data match. In this case, the provision of different reference data alternatives aims to allow the electronic control unit not just to distinguish between original and non-original capsules, but also to recognise different types of original capsules, and to be able to set different brewing parameters for each type.

In the context described above, the different innovative aspect which constitute the core of the invention were developed, also including the subject matter of the invention defined in the appended claims.

A first innovative aspect of this, which can be implemented independently of the others, relates to the shape of the reading surface 12, that is to say, of the part of the surface of the recognition element 11 which, when the capsule 4 is closed in the infusion chamber 3, is facing the return light radiation acquiring surface 27 of the detecting device 13. According to the first innovative aspect, the reading surface 12 forms a convexity which is directed towards the detecting device 13 or, considering only the capsule 4, which is directed towards the opposite side to that on which the powdered food substance 5 is located (usually towards the infeed wall 9). In the preferred embodiment, the reading surface 12 has a shape which is similar to that of a spherical cap, preferably with a radius of curvature of between 2 and 5 mm.

In the preferred embodiments, at least the reading surface 12 is made in a portion of the recognition element 11 which, considered as a whole, has stable dimensions in the conditions of use, that is to say, is such that it keeps both its overall shape and, above all, the convexity described above. In some embodiments, as already indicated, that is achieved by associating the recognition element 11 with the distributing unit 14, or directly using the distributing unit 14 as the recognition element 11. That does not alter the fact that the recognition element 11, as a whole, may be subject to small elastic deformations, for example of the type described below.

Figure 5:
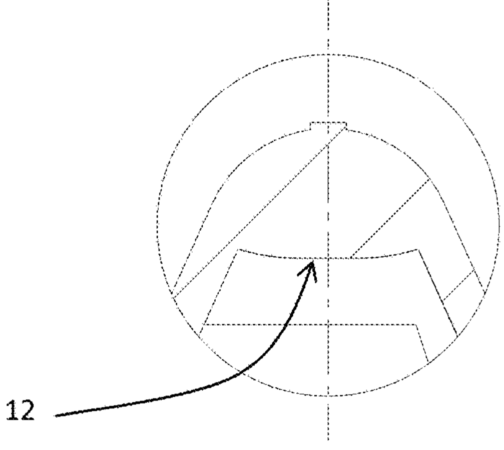
FIG. 5 is an enlarged view of the detail V of FIG. 4.
Figure 6:
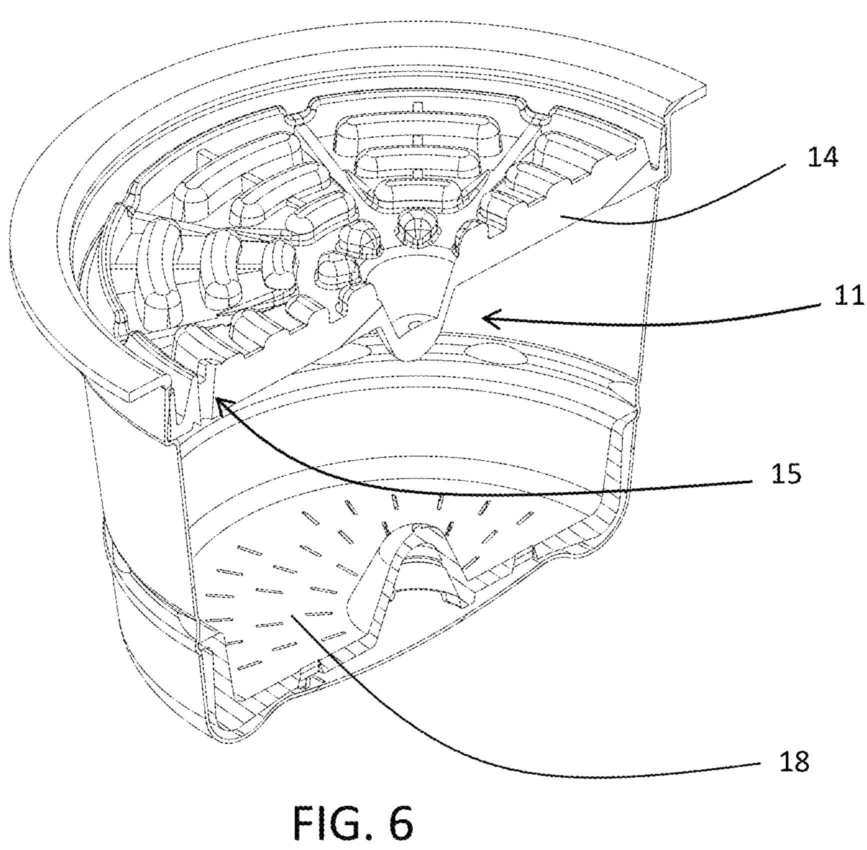
FIG. 6 is an axonometric axial section of a second capsule made in accordance with the first innovative aspect of this invention.

Advantageously, if the distributing unit 14 comprises the recess 16 for housing the first piercing unit 17, the reading surface 12 is positioned on the bottom of the recess 16, as illustrated for example in FIG. 5, where the reading surface 12 is convex as a whole, despite having a level central part and a lateral part with the shape of a spherical zone.

The devising of this first innovative aspect brought at least two significant benefits. First, making the surface as a whole convex significantly reduced the risk of false negatives due to the presence of granules of powder (of the food substance) on the reading surface 12 itself. Second, when making the distributing unit 14 and the recognition element 11 in a single body by injection moulding, the convex shape of the reading surface 12 reduces the risk that in the mould it may be subject to deformations due to material shrinkage, which in contrast has been seen to happen more easily if the reading surface is completely flat. Avoiding these deformations may be important, since a deformed reading surface 12 may prevent a correct recognition by the detecting device 13.

The first innovative aspect described above may be implemented both when making a system 1 (brewing unit 2 and capsule 4), and when making only capsules for systems which are otherwise already developed.

According to a second innovative, also implementable independently of the other three, this invention provides for, first, making the recognition element 11 using a material capable of emitting/reflecting light radiations having predetermined characteristics, if it is lit with an incident light radiation having a predetermined band of wavelengths. In particular, the preferred embodiment provides for the use of a fluorescent material for making the recognition element 11, that is to say, a material capable of emitting light radiations in the visible range if lit with light radiations in the ultraviolet range.

The more general implementation of the second innovative aspect provides for the use, as recognition criterion, of the measurement of how the intensity of the return light radiation is distributed amongst a plurality of bands of wavelengths. In particular, it provides for the identification of a main band of wavelengths and, within the main band, a plurality of secondary bands which are separate from each other. In the preferred embodiment the secondary bands together define the entire main band. Taking as a reference the total intensity of the return light radiation in the main band, an assessment is then made of how much of that total intensity is associated with wave frequencies included in each secondary band. The intensity associated with each individual secondary band may therefore vary between 0% and 100% of the total intensity in the main band.

Again in accordance with the second innovative aspect, the detecting device 13 and/or the electronic control unit are therefore configured to use, as real data, the division of the total intensity of return light radiation detected by the detecting device 13 in the main band. Advantageously, the division is assessed as the ratio of the intensity in each secondary band, to the total intensity in the main band, that is to say, as the share of the total intensity associated with the main band, which is associated with each secondary band. If the main band corresponds to the sum of the secondary bands, the total intensity in the main band is equal to the sum of the intensities in the three secondary bands.

Similarly, the reference data comprise one or more combinations of division of the total intensity into each secondary band. Each of these one or more combinations of division of the total intensity, comprises, for each secondary band, a range of values allowable for the share of intensity of the return light radiation received in that secondary band, relative to the total intensity received in the main band. For example, in the preferred embodiment described below, where three secondary bands are present, the reference data comprise one or more of the following combinations:

Combination A: intensity in the first secondary band in the range 20-45%, intensity in the second secondary band in the range 30-40%, and intensity in the third secondary band in the range 20-40%;

Combination B: intensity in the first secondary band in the range 3-8%, intensity in the second secondary band in the range 60-72%, and intensity in the third secondary band in the range 20-32%;

Combination C: intensity in the first secondary band in the range 0-3%, intensity in the second secondary band in the range 25-40%, and intensity in the third secondary band in the range 60-75%.

In accordance with the second innovative aspect of this invention, the electronic control unit is programmed to execute the comparing step, and to indicate a match between real data and reference data, when the real data relating to each secondary band each fall within the respective range of a same combination of intensities (A, B or C in the example) included in the reference data.

In the case of the preferred embodiment of the second innovative aspect of this invention, in which a fluorescent material is used, the lighting device 26 is configured to light the reading surface 12 with an incident light radiation which has a band of wavelengths at least partly included in the ultraviolet range, preferably a band between 360 and 405 nm. As seen above, this result may advantageously be achieved with low cost using an LED 31 associated with a suitably configured dichroic mirror. In particular, in some embodiments the LED used is the LDUV2043 LED to which FIG. 20 relates. That LED has a 80 nm wide emission band centred at the frequency of 400 nm. The dichroic filter therefore filters its upper band (405-440 nm).

In the preferred embodiment, the three secondary bands are as follows:

- a first secondary band with wavelengths of between 600 nm and 700 nm;
- a second secondary band with wavelengths of between 500 nm and 600 nm; and
- a third secondary band with wavelengths of between 400 nm and 500 nm;
- and the main band corresponds to the three bands joined together (from 400 nm to 700 nm—the values 500 nm and 600 nm are preferably each included in only one secondary band).

In some preferred embodiments, the sensor used is the BH1749NUC sensor from the company ROHM Co.

The reference data saved in the electronic control unit, which are used for the comparing step, are constituted of at least one combination of divisions of the intensity into the three secondary bands, where for each secondary band there is preferably an allowable range for the respective share of the total intensity.

In more detail, lengthy experiments carried out by the Applicant allowed the identification of several preferred combinations as regards the divisions of the intensity into the three secondary bands, which allow optimisation of the recognition operations in the preferred embodiment. The three preferred combinations, for the three secondary bands defined above, are as follows (where, as already indicated, each percentage value refers to the ratio of the intensity in that secondary band to the sum of the intensities in the three secondary bands):

- Combination A: intensity in the first secondary band in the range 20-45%, intensity in the second secondary band in the range 30-40%, and intensity in the third secondary band in the range 20-40%;
- Combination B: intensity in the first secondary band in the range 3-8%, intensity in the second secondary band in the range 60-72%, and intensity in the third secondary band in the range 20-32%;
- Combination C: intensity in the first secondary band in the range 0-3%, intensity in the second secondary band in the range 25-40%, and intensity in the third secondary band in the range 60-75%.

In accordance with the second innovative aspect of this invention, as already indicated, the electronic control unit is programmed to execute the comparing step, and to indicate a match between real data and reference data, when the real data relating to each secondary band each fall within the respective range of a same combination of intensities (A, B or C) provided for in the reference data.

For example, if the real data detected indicate that the intensity of light radiation detected as a whole in the main band is divided as follows: 38% in the first secondary band, 33% in the second secondary band, and 29% in the third secondary band, it falls within Combination A and the result of the comparing step will be that a match exists. If, in contrast, the real data detected indicate that the intensity of light radiation detected as a whole in the main band is divided as follows: 38% in the first secondary band, 41% in the second secondary band, and 21% in the third secondary band that division does not fall within any of the combinations which define the reference data (although for two secondary bands of the three they match Combination A) and therefore the result of the comparing step will be that no match exists. In some embodiments the reference data comprise a single combination of intensities, in particular, in the preferred embodiments, one of Combination A, Combination B or Combination C.

In contrast, in other embodiments, the reference data comprise two or more combinations of intensities. In this case, the electronic control unit is advantageously programmed to control the operation of the hot water supplying means in a different way as a function of the combination of saved reference data with which the real data match.

In some embodiments in accordance with the second innovative aspect, the detecting device 13 advantageously comprises one or more filters coupled to the electronic sensor 33 for filtering light radiations with frequencies which do not match those of the main band so as to reduce the incidence of any electromagnetic "noise". In the embodiment illustrated in FIG. 17, a first filter is constituted of the dichroic filter, which is configured to allow only the light radiations in the visible spectrum to pass. However, downstream of the dichroic mirror there is also a Wratten filter 34, that is to say, a filter which is also capable of allowing visible radiations to pass while filtering ultraviolet radiations. In particular it is possible to use the 430FWP7575 filter made by the already referred to Knight Opticals Ltd., to which FIG. 19 refers, which shows the percentage of intensity transmitted by the filter as a function of the wavelength (in nm).

As regards the capsule 4, in accordance with the second innovative aspect the recognition element 11 is made of a material which, when it is lit with an incident light radiation with a wavelength of between 360 and 405 nm, emits and/or reflects a return light radiation which has a division of the intensity of light radiation into each of the above-mentioned three secondary bands, which is selected in the group of combinations comprising Combination A, Combination B and Combination C. For example, that result may be obtained by adding a suitable fluorescent pigment to the mixture used to make the recognition element 11.

The second innovative aspect described above may therefore be implemented both in a complete system 1 (brewing unit 2 and capsule 4), and for making only extracting units or capsules intended to be used in a system 1 already developed by others (that is to say, the scope of the second innovative aspect covers both a brewing unit 2 capable of using capsules in accordance with what is described above, and capsules in which the recognition element 11 has the behaviour indicated above).

Moving on to the third independent innovative aspect of this invention (which is the subject matter of the appended claims), this relates to a particular interaction between the first piercing unit 17 and the recognition element 11. In accordance with the third innovative aspect, the return light radiation acquiring surface 27 is first fixed to the first piercing unit 17 in such a way as to adopt a predetermined position (except for design tolerances) in the infusion chamber 3.

Advantageously the acquiring surface 27 is constituted of the first end 29 of the light radiation transmitting element 28. In some embodiments, the light radiation transmitting element 28 partly extends either parallel or coaxial to the intake duct 22.

Figures 8, 9:
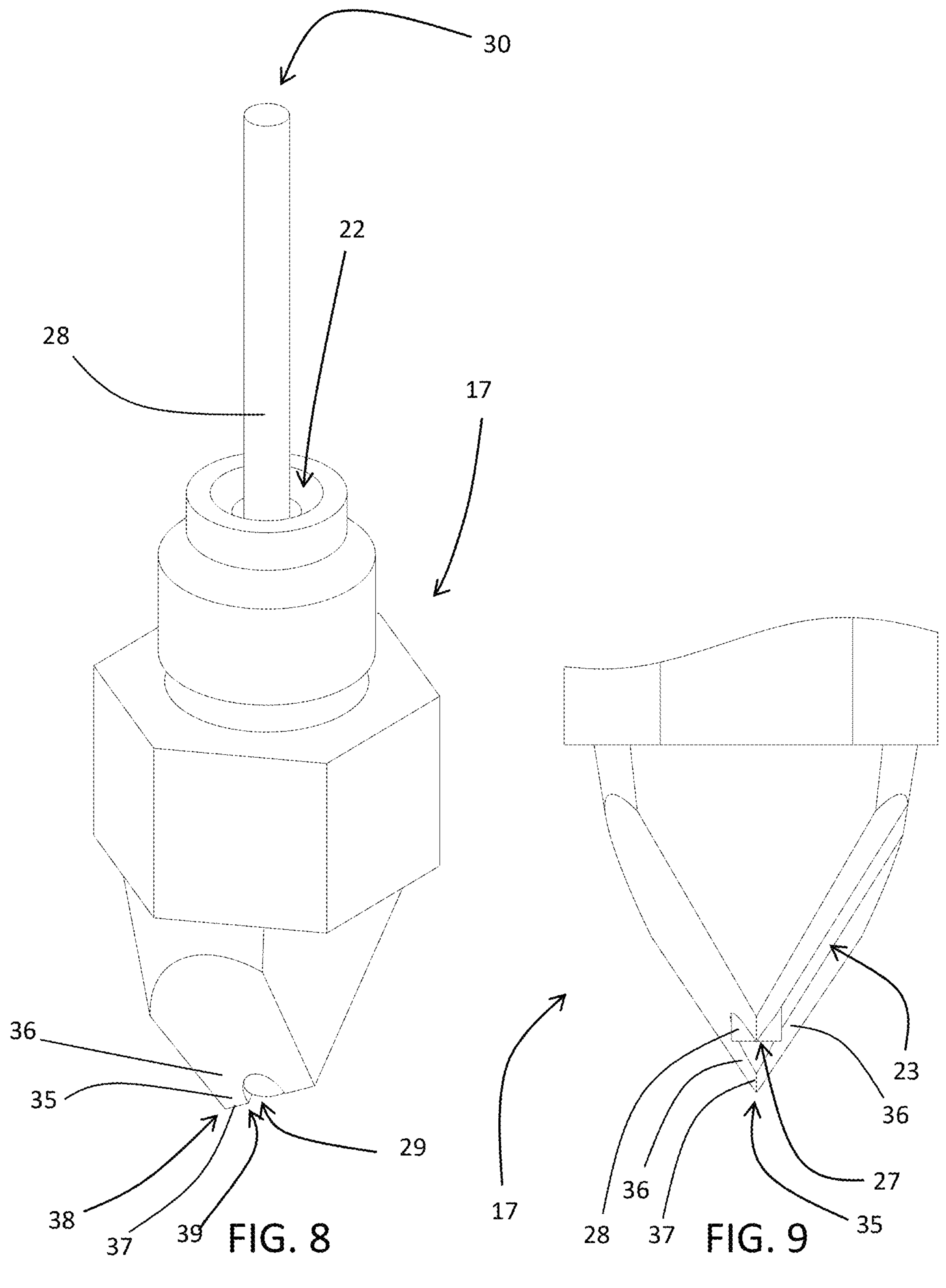
FIG. 8 is an axonometric view of a detail of a piercing unit of a brewing unit made in accordance with a second innovative aspect of this invention.
FIG. 9 is an enlarged front view of the lower part of the piercing unit of FIG. 8.
Figures 10, 11:
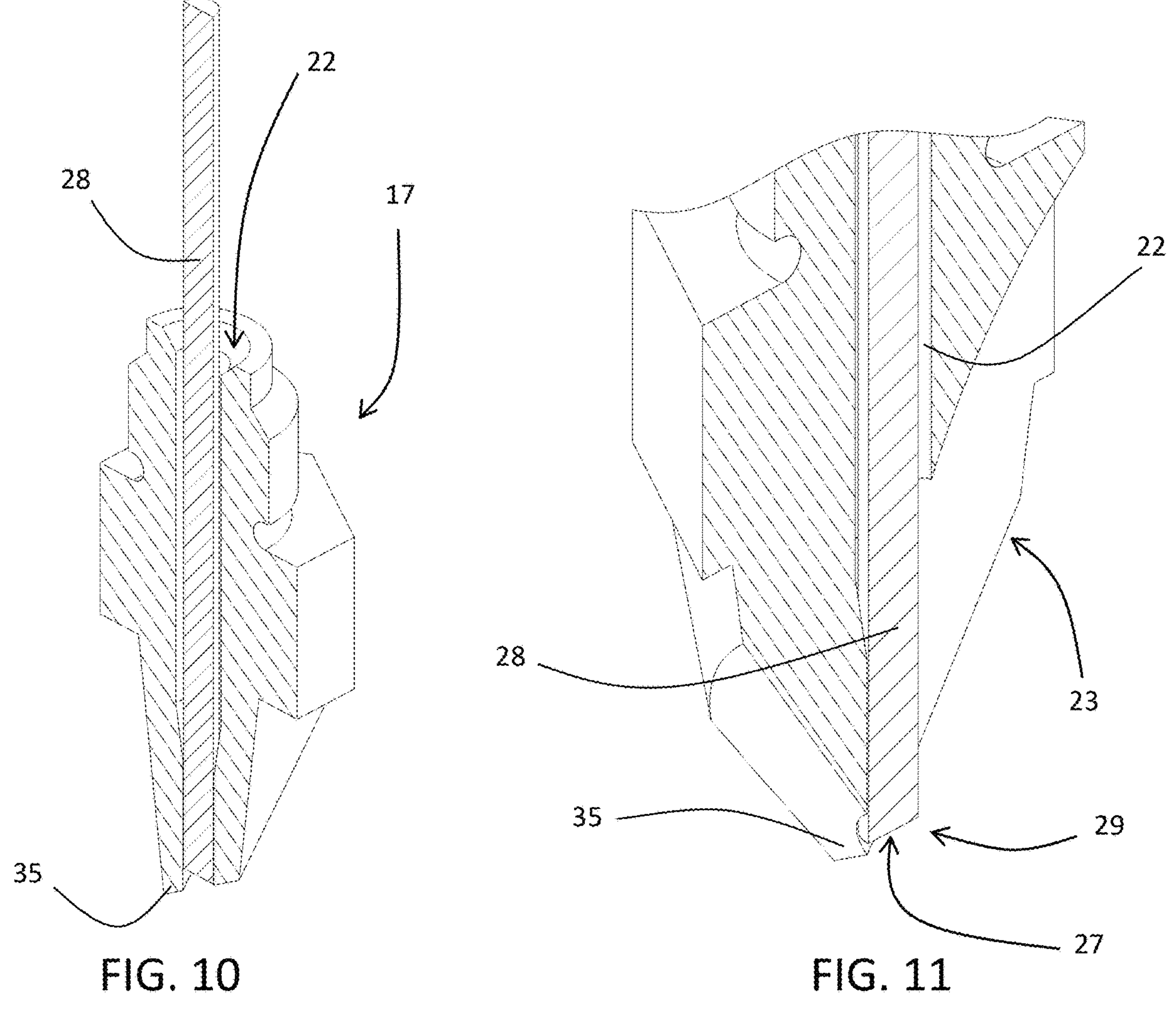
FIG. 10 is an axial section of the piercing unit of FIG. 8.
FIG. 11 is an axial section of the lower part of the piercing unit of FIG. 8, according to a section plane perpendicular to that of FIG. 10.

The first piercing unit 17 has a distal portion 35 which is configured to pierce the infeed wall 9 of the capsule 4 and which, in the brewing configuration, projects inside the infusion chamber 3 more than the light radiation acquiring surface 27 (FIGS. 9 and 10).

Advantageously the distal portion 35 is positioned off-centre relative to a central axis of the acquiring surface 27, on only one side of it. Preferably positioned on the opposite side of the acquiring surface 27 is the outlet 23 of the intake duct 22.

In the embodiment illustrated (FIGS. 8 and 9) the distal portion 35 has two flat lateral surfaces 36 which converge on a cutting edge 37 which extends radially and which, proceeding from inside to outside is angled in such a way that the more external part 38 projects into the infusion chamber 3 more than the more internal part 39.

Given the sizing of the first piercing unit 17 and of the infusion chamber 3, the capsule 4 is configured and sized in such a way that the first piercing unit 17 makes contact with the recognition element 11, when the capsule 4 is inserted in the infusion chamber 3, according to the methods described below. Advantageously, there are two alternative possibilities.

According to the first possibility, when the capsule 4 is contained in the infusion chamber 3, the distal portion 35 of the first piercing unit 17 is resting on the recognition element 11 and the light radiation acquiring surface 27 is at a predetermined distance from the recognition element 11 (solution not illustrated).

Figure 14:
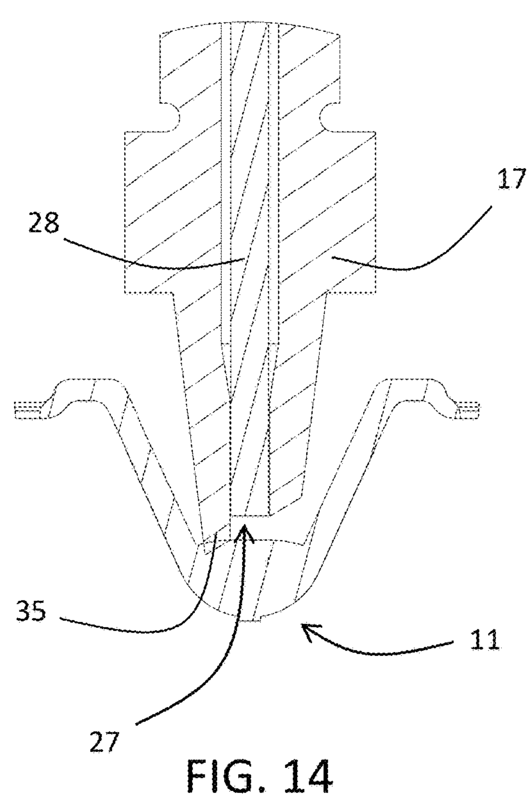
FIGS. 14 and 15 show two possible real couplings, with interference, between the coupled parts of FIG. 13.
Figure 15:
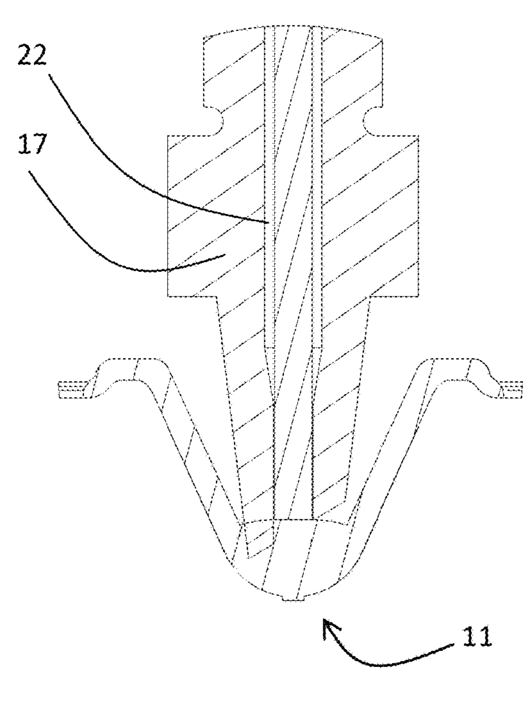

In contrast, according to the second possibility, when the capsule 4 is contained in the infusion chamber 3, the distal portion 35 of the first piercing unit 17 is partly inserted in the recognition element 11 (that is to say, penetrates it, but only partly and without making a hole completely through it) and the light radiation acquiring surface 27 is, either at a distance from the recognition element 11 (FIG. 14), or at most resting on the recognition element 11 itself (FIG. 15).

In all of the cases the light radiation acquiring surface 27 is never further away from the recognition element 11 than the predetermined distance (determined at the design stage except for manufacturing tolerances).

This result may be achieved, on one hand by making the recognition element 11 in such a way that it is movable inwards in the infusion chamber 3 under the thrust effect of the distal portion 35 of the first piercing unit 17, and on the other hand by suitably sizing the first piercing unit 17 and/or the capsule 4.

In the preferred embodiment, in which the recognition element 11 is associated with the distributing unit 14 or is constituted of the distributing unit 14, the mobility of the recognition element 11 is obtained only thanks to the elastic deformability of the distributing unit 14 itself which, although having stable dimensions, is capable of bending slightly at its central zone where the recess 16 is located. It should be noticed that the travel required may generally be roughly several tenths of a millimetre.

Figure 12:
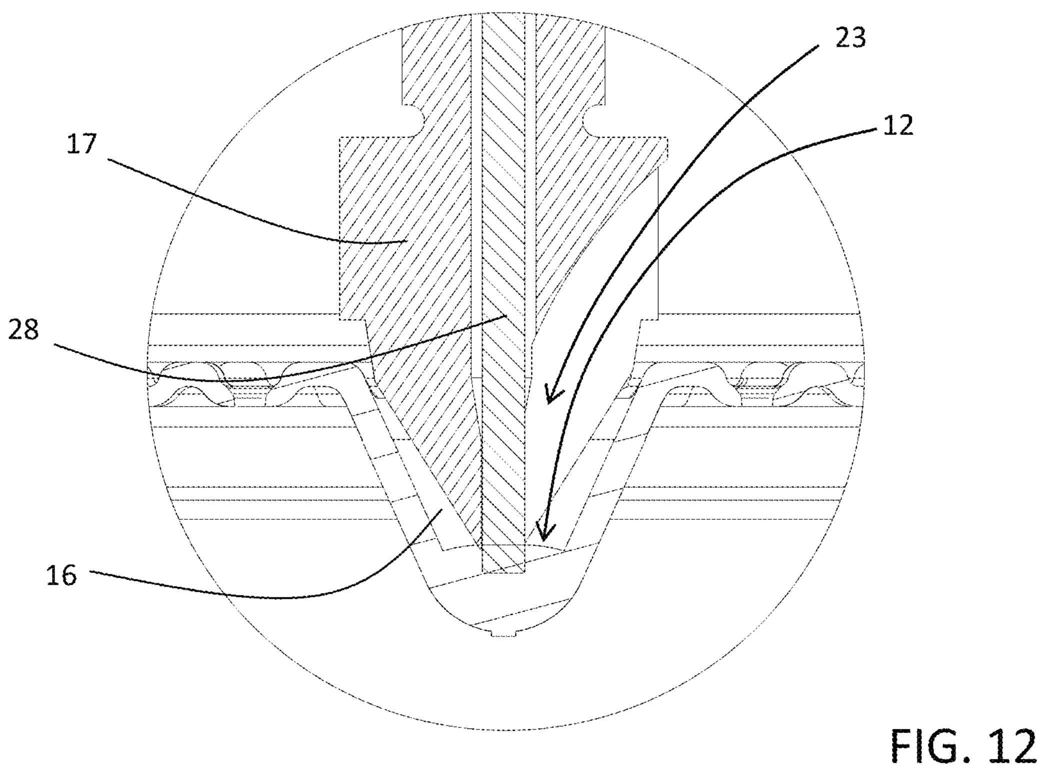
FIG. 12 is a front view in cross-section of the piercing unit of FIG. 11, coupled to the central part of the distributing unit of FIG. 4, showing designed physical interference.
Figure 13:
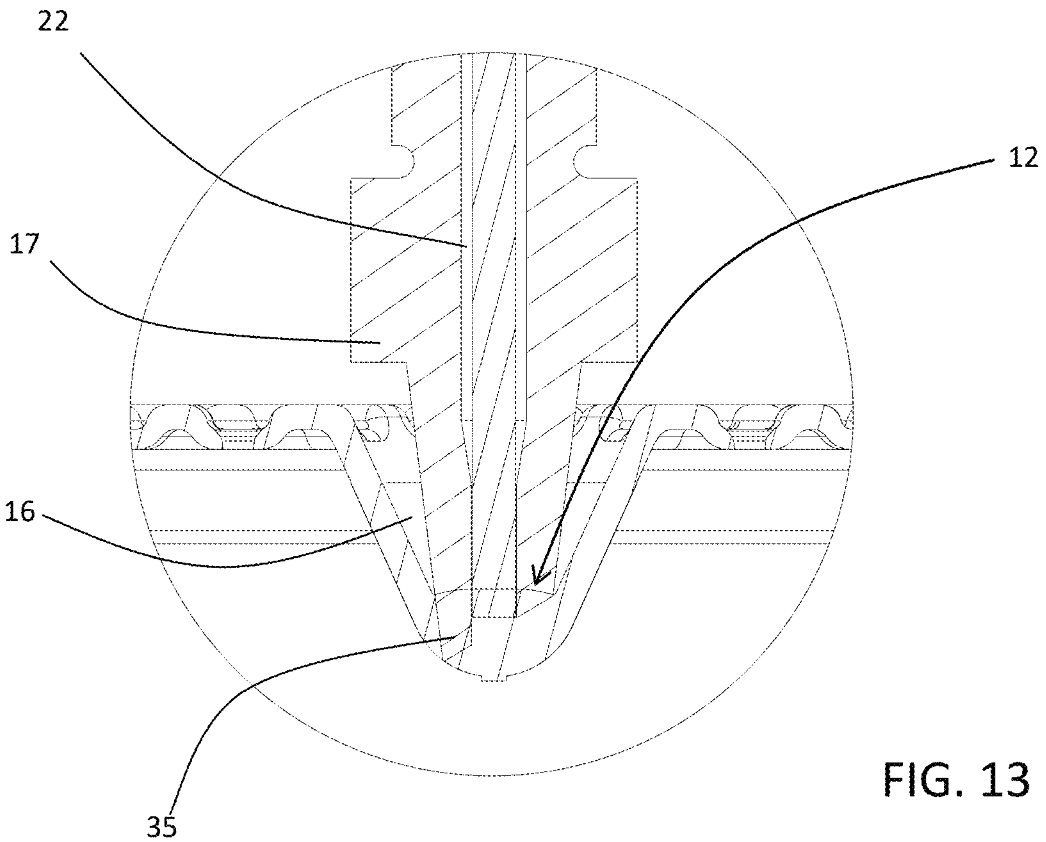
FIG. 13 shows the same parts as in FIG. 12 in cross-section according to a plane perpendicular to the cross-section plane of FIG. 12, coupled with the designed physical interference.

In contrast, sizing is performed by providing for, at the design stage, some physical interference between the first piercing unit 17 and the distributing element when the capsule 4 is inserted in the infusion chamber 3. An example of design sizing with interference which, even considering the most unfavourable combination as regards manufacturing tolerances, guarantees contact between the first piercing unit 17 and the recognition element 11, is illustrated in FIGS. 12 and 13.

If the reading surface 12 forms a convexity directed towards the detecting device 13, in accordance with what is provided for by the first innovative aspect, the distal portion 35 of the first piercing unit 17 acts in contact against the convex reading surface 12 as illustrated in FIGS. 14 and 15.

The third innovative aspect described above may also be implemented both when making a complete system 1 (brewing unit 2 and capsule 4), and when making only the brewing unit 2 or only the capsules.

Moving on to the final innovative also applicable independently of the application of one or more of the others, first it provides for the hot water supplying means being configured to supply the hot water inside the capsule 4, at the reading surface 12 of the recognition element 11 (towards which the lighting device 26 and the detecting device 13 are directed when the capsule 4 is inserted in the infusion chamber 3).

In particular, the hot water supplying means are configured to supply the hot water inside the capsule 4, at the reading surface 12 of the recognition element 11, in such a way that the water they supply flows on the reading surface 12, and therefore can remove any particles of powder present on it.

Also according to the fourth innovative aspect of this invention, the electronic control unit is programmed to execute a cleaning step for cleaning the recognition element 11, by activating the hot water supplying means for washing the reading surface 12, when a first execution of the comparing step has indicated that the real data detected by the detecting device 13 do not match reference data (that is to say, when no match exists).

The basic principle of the cleaning step for cleaning the recognition element 11 is that of supplying a limited quantity of water (that is to say, not enough to cause brewing of the beverage, or at least not complete brewing), but which can be sufficient to shift any particles of powder which may be resting on the reading surface 12. In order to achieve that result it may also be useful to control the pressure and/or the flow rate of the water supplied.

In some embodiments, the electronic control unit is programmed to execute the cleaning step by activating the hot water supplying means for a time of between 1 and 2 seconds.

In some embodiments, the electronic control unit is programmed to execute the cleaning step by activating the hot water supplying means in order to supply a volume of water of between 5 and 15 ml.

In some embodiments, the electronic control unit is programmed to execute the cleaning step by activating the hot water supplying means with a flow rate of between 23 and 29 l/h.

In some embodiments, the electronic control unit is programmed to execute the cleaning step by activating the hot water supplying means in order to supply water at a pressure of between 1.5 and 12 bar.

Again in accordance with the fourth innovative aspect, in some embodiments, after having executed the cleaning step, the electronic control unit is programmed to acquire from the detecting device 13 new real data relating to the cleaned reading surface 12, and to execute the comparing step a second time, using these new real data. As can be inferred, if the cleaning step effectively cleaned the reading surface 12, the new real data will be different from those used for the first execution of the comparing step, whilst if the reading surface 12 was already clean, or if the cleaning step did not allow removal of any dirt present, the new real data will be substantially the same as the previous real data.

In some embodiments the electronic control unit is programmed to execute the cleaning step a plurality of times, alternating it with a waiting step.

In some embodiments, when the first execution of the comparing step has indicated that the real data do not match reference data, the electronic control unit is programmed to repeat the comparing step continuously during execution of one or more cleaning steps. In some embodiments, the electronic control unit is programmed to interrupt the one or more cleaning steps and to pass to the managing step, at the moment when the comparing step indicates that the real data match reference data.

In particular, the electronic control unit is programmed to continuously acquire from the detecting device 13 new real data relating to the reading surface 12 even during the cleaning step and, if necessary, for a predetermined time after the cleaning step, and to execute the comparing step by continuously examining the new real data which are gradually acquired.

When the final comparing step provided for has also ended (executed by examining the data only once after the cleaning step, or continuously during, and if necessary even after, the cleaning step), the electronic control unit is programmed to also execute the managing step again, this time based on the results obtained with the second execution of the comparing step, that is to say, based on whether or not that comparing step finds a match between real data and reference data.

In some embodiments, when even the one or more further executions of the comparing step have indicated that the real data detected by the detecting device 13 do not match reference data, the electronic unit is programmed to consider the absence of a match to be definitive and to execute the managing step and to act accordingly as regards activating or not activating the hot water feeding means.

In contrast, in other embodiments, when a second execution of the comparing step has indicated that the real data detected by the detecting device 13 do not match reference data, the electronic control unit is programmed to again execute, one after another, a cleaning step and a comparing step based on the results obtained with the last execution of the comparing step.

In some embodiments, this may be repeated a plurality of times when the last previous execution of the comparing step has indicated that the real data do not match reference data, before proceeding with execution of the managing step.

During the executions of the cleaning step after the first, the adoption of different execution parameters may even be provided for, in particular parameters which may determine improved cleaning of the reading surface 12 compared with the last execution (for example, compared with execution of the cleaning step immediately before: supplies of greater quantities of water, supplies with higher flow rates/pressures or supplies for longer times). For example, in some embodiments a maximum of three executions of the cleaning step are provided for, each lasting between 1 and 2 seconds (preferably equal to 1.5 seconds), alternated with waiting steps which are advantageously of the same duration. In that case, the water pumped by the pump for cleaning may be roughly 10-13 ml for the first execution, then gradually increase to around 26-32 ml in total at the end of the third execution. Between the start of the first execution and the end of the third, the supplying pressure may gradually increase from approximately 1.5 bar to approximately 12 bar. In these embodiments the comparing step is executed continuously from the start of the first execution of the cleaning step until the end of the last execution of the cleaning step. Moreover, the cleaning cycle is immediately interrupted as soon as the comparing step indicates that the real data detected by the detecting device 13 match reference data.

The fourth innovative aspect described above may be applied both when making an entire system 1 (brewing unit 2 and capsule 4), and when making only the brewing unit 2.

Operation of the various embodiments of the system 1 according to this invention is easy to deduce from the preceding description, as regards the innovative aspects, whilst it is similar to that of prior art systems as regards insertion and removal of the capsule 4 and forming of the beverage.

This invention brings important advantages. Further advantages are provided by the other innovative aspects which are part of this invention.

Thanks to this invention, it has been possible to provide a system for making beverages, of the type which uses an optical recognition element placed inside the capsule, which guarantees a high level of recognition reliability despite using the normal manufacturing tolerances when making the brewing unit and capsules.

Further advantages are provided by the other innovative aspects which are part of this invention.

Thanks to the first innovative aspect, it has been possible to provide a system for making beverages, of the type which uses an optical recognition element placed inside the capsule, which is less subject to the risk of false negatives both because of the presence of granules of powder on the reading surface, and, in the case of injection moulded recognition elements, because of moulding deformations of the reading surface.

Thanks to the second innovative aspect, it has been possible to provide a system for making beverages, of the type which uses an optical recognition element placed inside the capsule, based on an extremely reliable recognition criterion, which is an alternative to those of the prior art.

Thanks to the fourth innovative aspect, it has been possible to provide a system for making beverages, of the type which uses an optical recognition element placed inside the capsule, in which the risk of false negatives caused by the presence of granules of powder on the reading surface is minimised. Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A system for making beverages comprising a brewing unit (2) and a capsule (4) containing a powdered food substance (5), the capsule (4) comprising an outer casing (6), in which an infeed wall (9) and an outfeed wall (10) are identifiable, and a recognition element (11) placed inside the outer casing (6), wherein the brewing unit (2) comprises a first part (19) and a second part (20), which are switchable between a home configuration, in which they are at a distance from each other, and a brewing configuration, in which they are coupled and between them delimit an infusion chamber (3), wherein the capsule (4) is configured to be inserted in the infusion chamber (3), wherein the brewing unit (2) comprises:

- a first piercing unit (17) configured to pierce the infeed wall (9) of the capsule (4) inserted in the infusion chamber (3), supplying means for supplying hot water inside the capsule (4) inserted in the infusion chamber (3), through the infeed wall (9), and means for causing the outflow from inside the capsule (4) inserted in the infusion chamber (3), through the outfeed wall (10), of a beverage which has formed following interaction of the hot water with the powdered food substance (5);
- a lighting device (26) associated with the first piercing unit (17) and configured to light the recognition element (11) with an incident light radiation having a known band of wavelengths, and a detecting device (13) associated with the first piercing unit (17) and configured to detect a return light radiation which is emitted and/or reflected by the recognition element (11) following the lighting with the incident light radiation;
- an electronic control unit, connected to the detecting device (13) for receiving from it real data relating to characteristics of the return light radiation, the electronic control unit being programmed to execute a comparing step, in which the real data are compared with saved reference data, and a managing step, in which it manages operation of the brewing unit (2) in a different way if the comparing step indicates that the real data match reference data, compared with if the comparing step indicates that the real data do not match the reference data;

wherein, moreover:

- the detecting device (13) has an acquiring surface (27) for acquiring the return light radiation which is fixed to the first piercing unit (17);
- the first piercing unit (17) has a distal portion (35) configured to pierce the infeed wall (9) of the capsule (4) and which, in the brewing configuration, projects inside the infusion chamber (3) more than the light radiation acquiring surface (27);

characterised in that the capsule (4) is configured in such a way that, when the capsule (4) is inserted in the infusion chamber (3), alternatively the distal portion (35) of the first piercing unit (17) is resting on the recognition element (11) and the light radiation acquiring surface (27) is at a distance from the recognition element (11), or the distal portion (35) of the first piercing unit (17) is partly inserted in the recognition element (11) and the light radiation acquiring surface (27) is at a distance from the recognition element (11) or resting on the recognition element (11).

2. The system according to claim 1 wherein the recognition element (11) is movable inwards in the infusion chamber (3) under the thrust effect of the distal portion (35) of the first piercing unit (17).

3. The system according to claim 1 wherein the detecting device (13) comprises a light radiation transmitting element (28) and an electronic sensor (33), wherein the transmitting element (28) extends between a first end (29), which is associated with the first piercing unit (17) and which defines the return light radiation acquiring surface (27), and a second end (30), placed outside the infusion chamber (3), and wherein the electronic sensor (33) is optically associated with the second end (30) for receiving light radiation emitted by the second end (30).

4. The system according to claim 3 wherein the light transmitting element (28) is also part of the lighting device (26), and is configured to receive the incident light radiation at the second end (30) and to radiate it towards the recognition element (11) at the first end (29).

5. The system according to claim 3 wherein the distal portion (35) is positioned off-centre relative to a central axis of the acquiring surface (27).

6. The system according to claim 1 wherein the hot water supplying means comprise an intake duct (22) made in the first piercing unit (17) and which leads into the infusion chamber (3) and, in use, between the infeed wall (9) and the recognition element (11).

7. The system according to claim 6 wherein the intake duct (22) has an outlet (23) which is radial relative to a central axis of the first piercing unit (17).

8. The system according to claim 3, wherein the intake duct (22) has an outlet (23) which is radial relative to a central axis of the first piercing unit (17) and wherein the intake duct (22) partly extends either parallel or coaxial to the light radiation transmitting element (28).

9. The system according to claim 1 wherein the capsule (4) also comprises a distributing unit (14), interposed between the infeed wall (9) and the powdered food substance (5) and equipped with at least one through hole or permeable to water, and wherein the recognition element (11) is associated with the distributing unit (14) or is integrated in the distributing unit (14).

10. The system according to claim 1 wherein the capsule (4) also comprises a distributing unit (14), interposed between the infeed wall (9) and the powdered food substance (5) and equipped with at least one through hole or permeable to water, and wherein the recognition element (11) is constituted of the distributing unit (14).

11. The system according to claim 1 wherein the recognition element (11) has a reading surface (12) which is facing a return light radiation acquiring surface (27) of the detecting device (13), when the capsule (4) is closed in the infusion chamber (3), and wherein the reading surface (12) forms a convexity directed towards the detecting device (13), and against which the distal portion (35) of the first piercing unit (17) acts in contact.

12. The system according to claim 9, wherein the recognition element (11) has a reading surface (12) which is facing a return light radiation acquiring surface (27) of the detecting device (13), when the capsule (4) is closed in the infusion chamber (3), and wherein the reading surface (12) forms a convexity directed towards the detecting device (13), and against which the distal portion (35) of the first piercing unit (17) acts in contact and wherein the distributing unit (14) has a recess (16), on the bottom of which the reading surface (12) is positioned.

13. The system according to claim 12 wherein the recess (16) is configured to house the first piercing unit (17) of the brewing unit (2) when the capsule (4) is inserted in the infusion chamber (3).

14. A brewing unit for making beverages using a capsule (4) containing a powdered food substance (5), where the capsule (4) comprises an outer casing (6), in which an infeed wall (9) and an outfeed wall (10) are identifiable, and a recognition element (11) placed inside the outer casing (6), wherein the brewing unit (2) comprises a first part (19) and a second part (20), which are switchable between a home configuration, in which they are at a distance from each other, and a brewing configuration, in which they are coupled and between them delimit an infusion chamber (3) configured to house the capsule (4), and wherein the brewing unit (2) also comprises:

a first piercing unit (17) configured to pierce the infeed wall (9) of the capsule (4) inserted in the infusion chamber (3), supplying means for supplying hot water inside the capsule (4) inserted in the infusion chamber (3), through the infeed wall (9), and means for causing the outflow from inside the capsule (4) inserted in the infusion chamber (3), and through the outfeed wall (10), of a beverage which has formed following interaction of the hot water with the powdered food substance (5);

a lighting device (26) associated with the first piercing unit (17) and configured to light the recognition element (11) with an incident light radiation having a known band of wavelengths, and a detecting device (13) associated with the first piercing unit (17) and configured to detect a return light radiation which is emitted and/or reflected by the recognition element (11) following the lighting with the incident light radiation;

an electronic control unit, connected to the detecting device (13) for receiving from it real data relating to characteristics of the return light radiation, the electronic control unit being programmed to execute a comparing step, in which the real data are compared with saved reference data, and a managing step, in which it manages operation of the brewing unit (2) in a different way if the comparing step indicates that the real data match reference data, compared with if the comparing step indicates that the real data do not match the reference data;

wherein, moreover:

the detecting device (13) comprises an acquiring surface (27) for acquiring the light radiation which is fixed to the first piercing unit (17);

the first piercing unit (17) has a distal portion (35) configured to pierce the infeed wall (9) of the capsule (4) and which, in the brewing configuration, projects inwards in the infusion chamber (3) more than the light radiation acquiring surface (27);

the supplying means for supplying hot water inside the capsule (4) comprise an intake duct (22) made in the first piercing unit (17) and which leads into the infusion chamber (3) and, in use, between the infeed wall (9) and the recognition element (11);

characterised in that the intake duct (22) has an outlet (23) towards the infusion chamber (3) which is radial relative to a central axis of the first piercing unit (17).

15. The brewing unit according to claim 14 wherein the detecting device (13) comprises a light radiation transmitting element (28), which extends between a first end (29), associated with the first piercing unit (17) and which defines the acquiring surface (27), and a second end (30), placed outside the infusion chamber (3), and an electronic sensor (33) optically associated with the second end (30) for receiving the light radiation emitted by the second end (30).

16. The brewing unit according to claim 15 wherein the light transmitting element (28) is also part of the lighting device (26) and is configured to receive the incident light radiation at the second end (30) and to radiate it towards the recognition element (11) at the first end (29).

17. The brewing unit according to claim 15 wherein the distal portion (35) is positioned off-centre relative to a central axis of the acquiring surface (27).

18. The brewing unit according to claim 15, wherein the intake duct (22) partly extends parallel or coaxial to the light radiation transmitting element (28).

* * * * *